(12) United States Patent
Braga et al.

(10) Patent No.: US 6,356,697 B1
(45) Date of Patent: Mar. 12, 2002

(54) OPTICAL FIBER CABLE DISTRIBUTION SHELF WITH PIVOTABLY MOUNTED TRAYS

(75) Inventors: David J. Braga, Raleigh; Aditya K. Tarival, Cary; J. Raymon Zapatero, deceased, late of Winston Salem, all of NC (US), by Rosa Guido, legal representative

(73) Assignee: Sumitomo Electric Lightwave Corp., Research Triangle Park, NC (US)

( * ) Notice: Subject to any disclaimer, the term of this patent is extended or adjusted under 35 U.S.C. 154(b) by 0 days.

(21) Appl. No.: 09/448,065

(22) Filed: Nov. 23, 1999

Related U.S. Application Data

(63) Continuation of application No. 09/304,408, filed on May 4, 1999, now abandoned.

(51) Int. Cl.[7] .................................................. G02B 6/00
(52) U.S. Cl. ........................ 385/135; 385/134; 385/136
(58) Field of Search ................................ 385/134, 136, 385/137, 135, 139

(56) References Cited

U.S. PATENT DOCUMENTS

| | | | |
|---|---|---|---|
| 4,630,886 A | | 12/1986 | Laurielo et al. ........ 385/135 X |
| 4,708,430 A | | 11/1987 | Donaldson et al. ..... 385/135 X |
| 4,824,196 A | | 4/1989 | Bylander ................ 385/135 X |
| 4,832,436 A | | 5/1989 | Goto et al. ............. 385/135 X |
| 4,898,448 A | | 2/1990 | Cooper ................... 385/135 X |
| 4,995,688 A | | 2/1991 | Anton et al. ............ 385/135 X |
| 5,013,121 A | * | 5/1991 | Anton et al. ............ 385/135 X |
| 5,093,887 A | | 3/1992 | Witte ......................... 385/135 |
| 5,129,030 A | | 7/1992 | Petrunia .................... 385/135 |
| 5,167,001 A | | 11/1992 | Debortoli et al. ........... 385/135 |
| 5,335,349 A | | 8/1994 | Kutsch et al. ............... 455/6.1 |
| 5,337,400 A | * | 8/1994 | Morin et al. ................ 385/135 |
| 5,339,379 A | | 8/1994 | Kutsch et al. .............. 385/135 |
| 5,353,367 A | * | 10/1994 | Czosnowski et al. ....... 385/135 |
| 5,402,515 A | * | 3/1995 | Vidacovich et al. ........ 385/135 |
| 5,461,693 A | * | 10/1995 | Pimpinella ................. 385/135 |
| 5,490,229 A | | 2/1996 | Ghandeharizadeh et al. ..... 385/135 |
| 5,497,444 A | | 3/1996 | Wheeler ..................... 385/135 |
| 5,511,144 A | | 4/1996 | Hawkins et al. ............. 385/135 |
| 5,717,810 A | | 2/1998 | Wheeler ..................... 385/135 |
| 5,946,440 A | * | 8/1999 | Puetz ......................... 385/135 |
| 6,081,645 A | * | 6/2000 | Dotzer et al. ............... 385/135 |
| 6,167,183 A | * | 12/2000 | Swain ........................ 385/135 |

OTHER PUBLICATIONS

Siecor publication "FiberManager™ System" (Apr. 1, 1998,.
Siecor publication "Rack–Mountable LANscape™ Hardware System". (No date of publication).
Siecor publication "High–Density Frames" (Apr. 1, 1998).
Siecor publication "FDC® Family". (No date of publication).
ADC Telecommunications publication "Fiber Cable Management Products" (Nov., 1995).

* cited by examiner

*Primary Examiner*—Brian Healy
(74) *Attorney, Agent, or Firm*—Jenkins & Wilson, P.A.

(57) ABSTRACT

An optical fiber cable distribution shelf is disclosed which comprises at least one stack of pivotably mounted trays that each have a panel of optical adapters mounted to the front of the tray. Thus, each tray is pivotably mounted in the cable distribution shelf and can be pivoted horizontally from a position parallel to center to a forward perpendicular-to-center position for easy access to the front or rear optical fiber connectors leading to the adapters mounted on the tray.

24 Claims, 9 Drawing Sheets

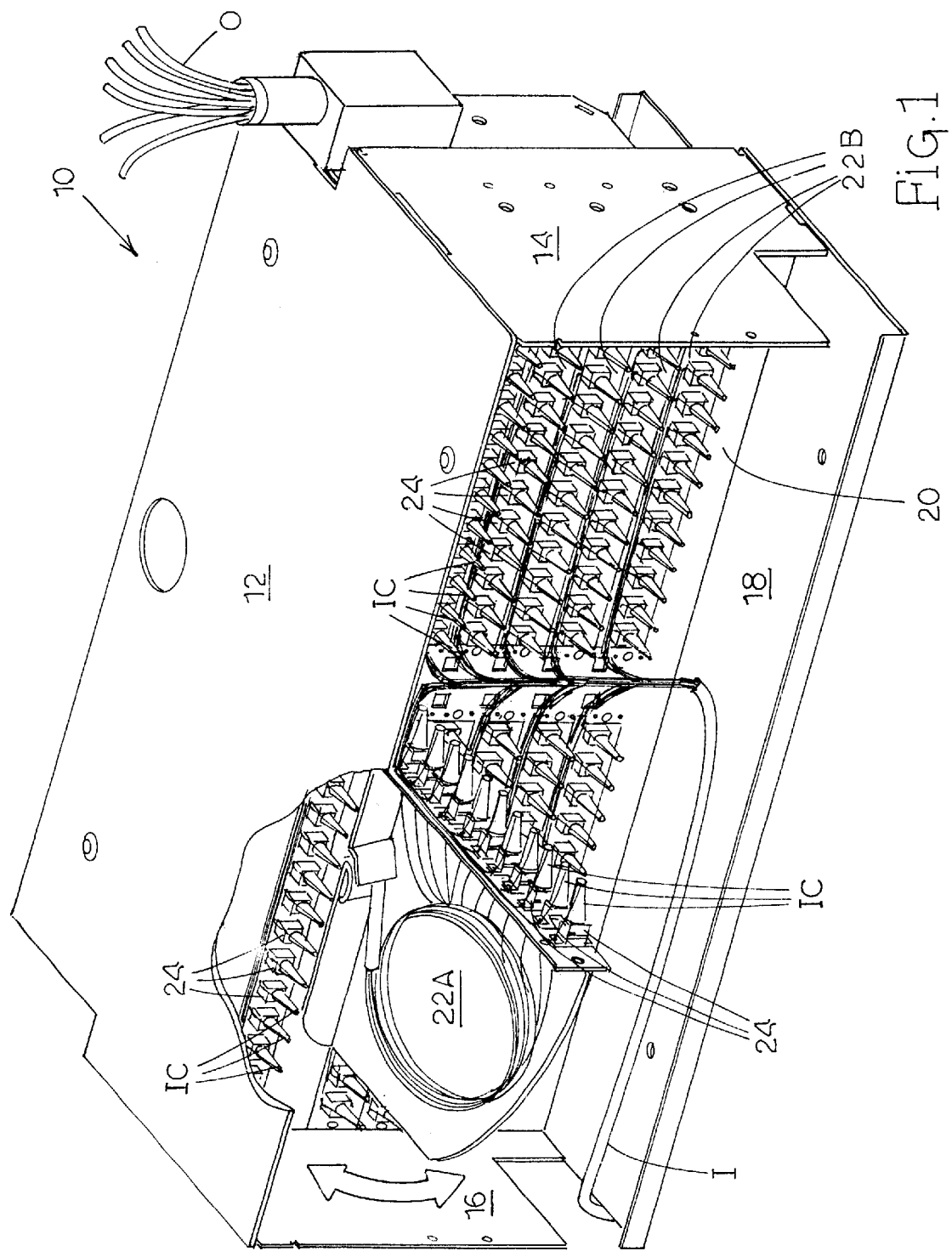

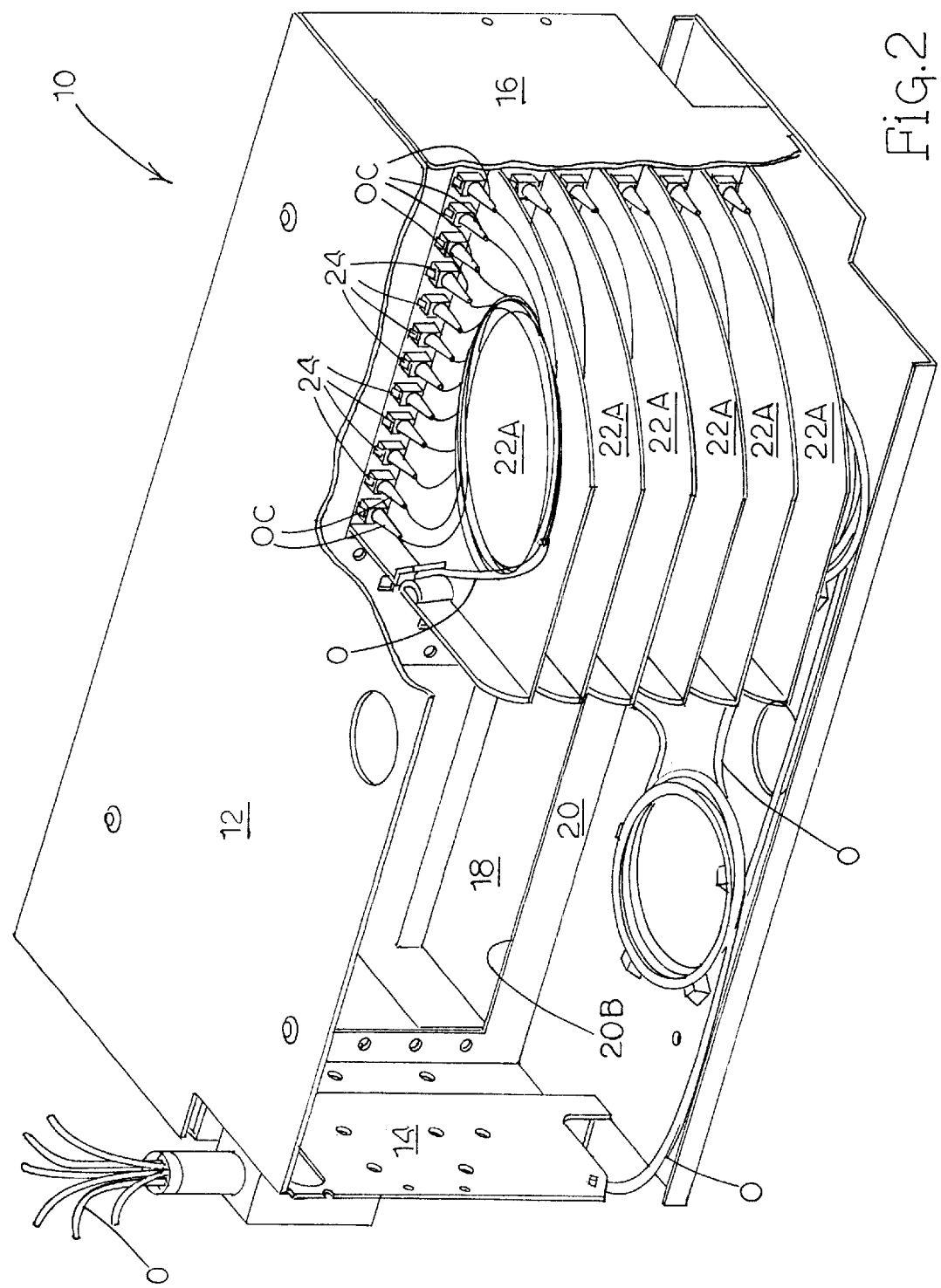

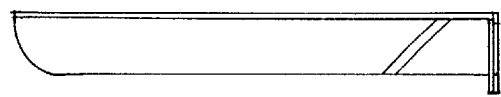
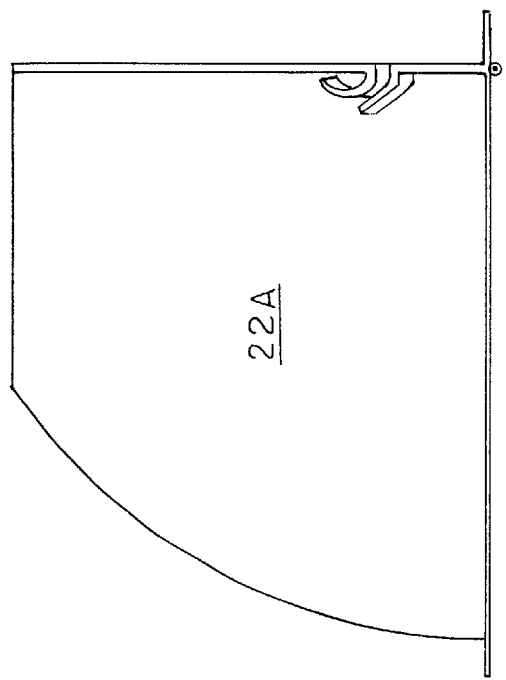
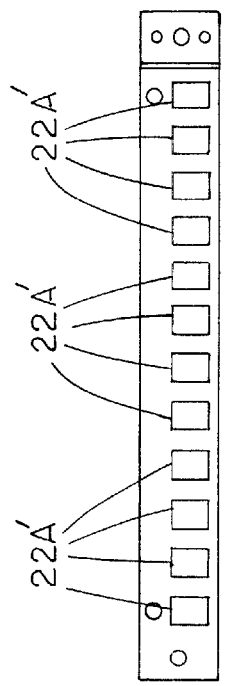
Fig. 3C
Fig. 3A
Fig. 3B

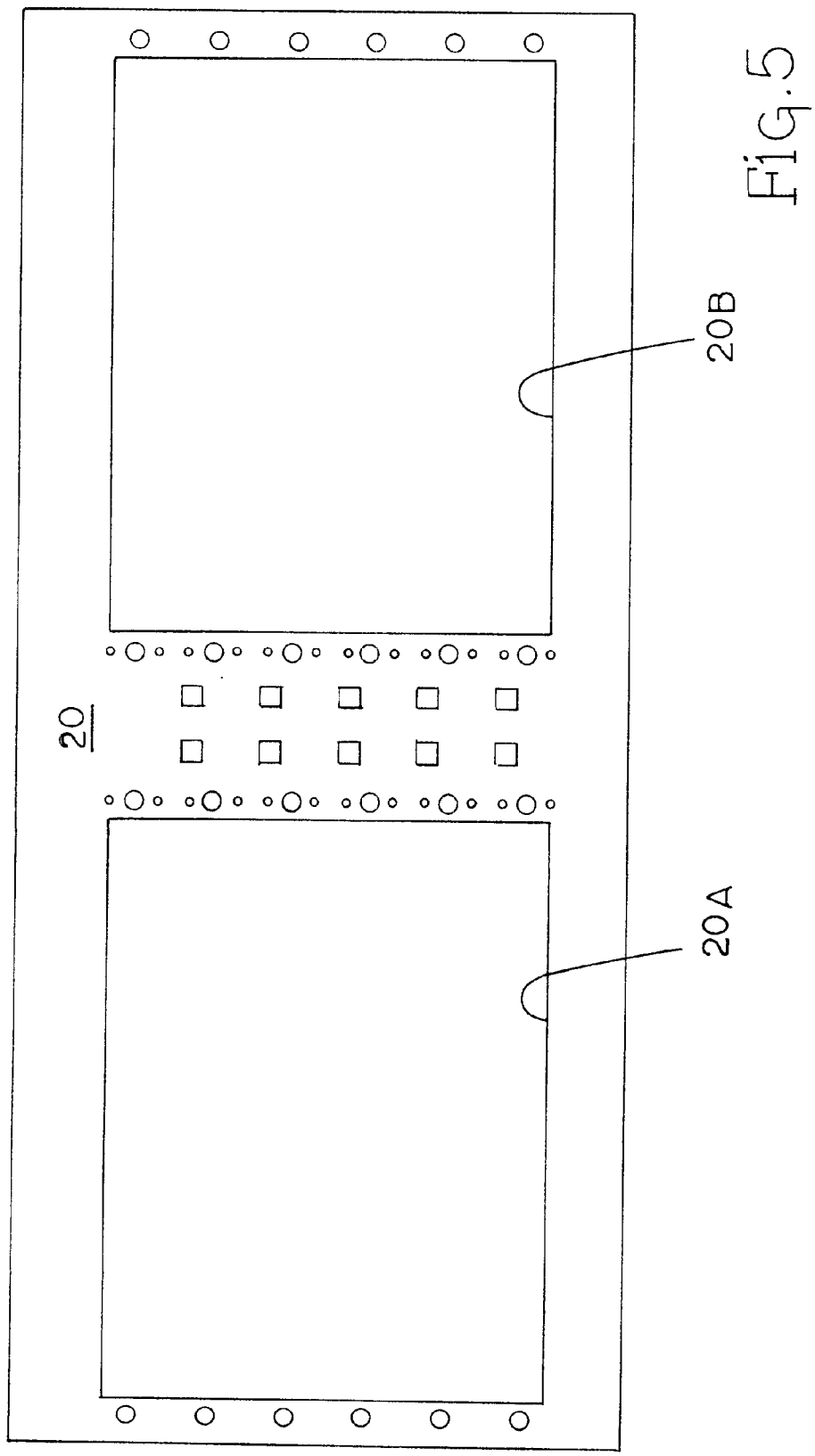

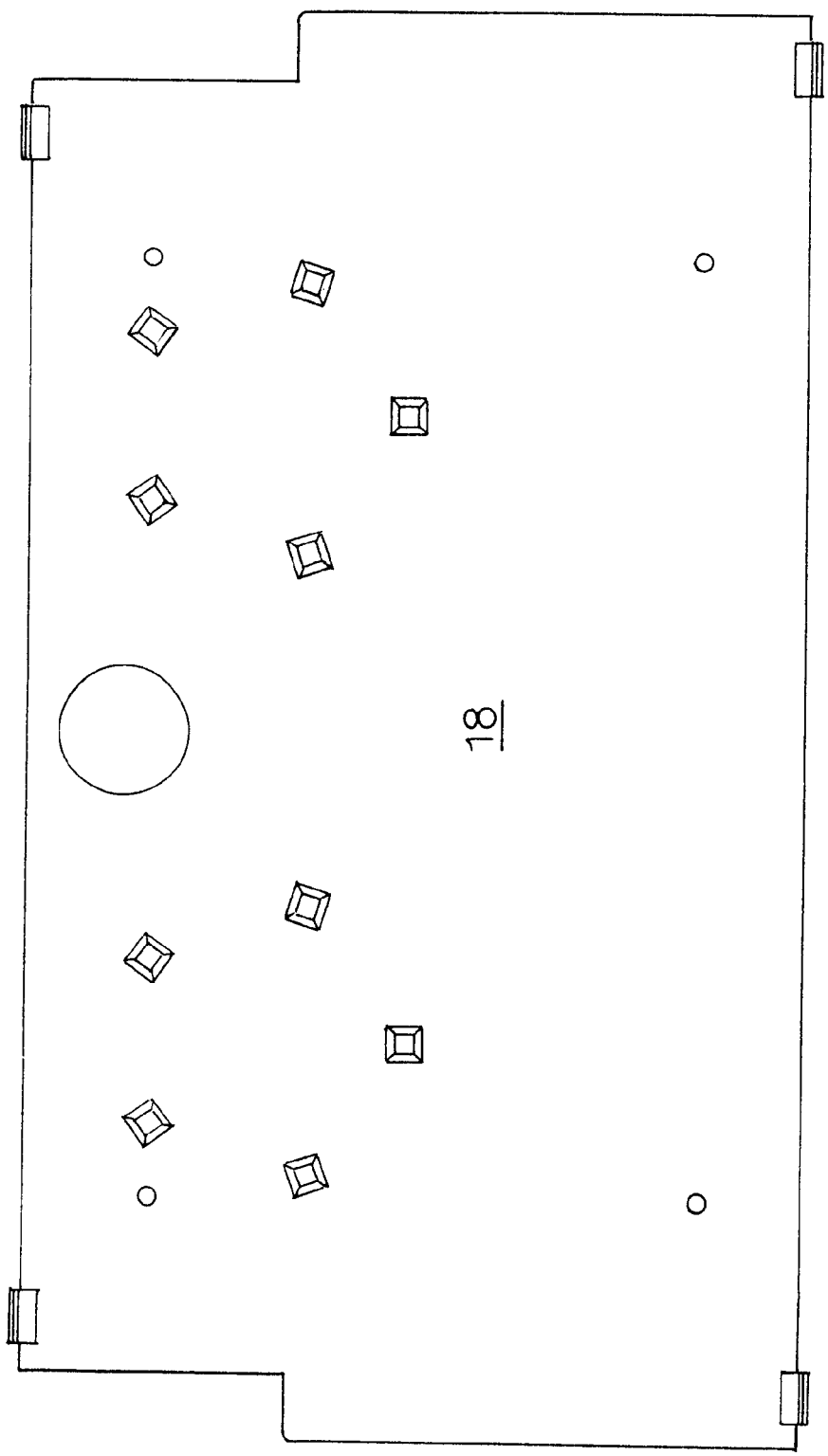

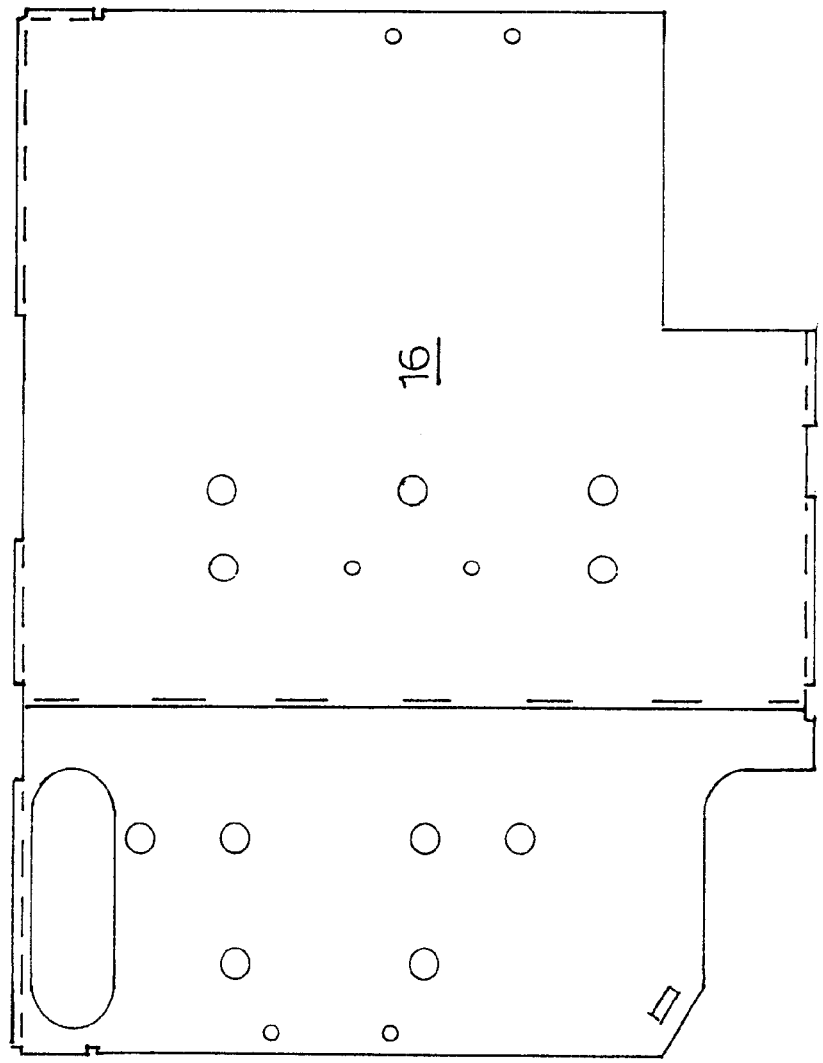

OPTICAL FIBER CABLE DISTRIBUTION SHELF WITH PIVOTABLY MOUNTED TRAYS

This application is a continuation of U.S. patent application Ser. No. 09/304,408, filed May 4, 1999, now abandoned.

TECHNICAL FIELD

The present invention relates to optical fiber distribution frames. More particularly, the present invention relates to an improved optical fiber cable distribution shelf for mounting in a conventional optical fiber distribution frame. The frame normally includes a plurality of cable distribution shelves mounted therein and wherein each cable distribution shelf includes a plurality of optical connectors for connecting external fiber optic cable with selected optical fibers leading to individual telephone, computer systems or the like.

BACKGROUND ART

Optical fiber distribution frames are routinely used in telecommunications as an interface between optical fiber feeder and optical fiber distribution cables. The frames usually include a plurality of drawers or shelves which each include a panel within which is mounted an array of optical fiber connectors. It is preferable for distribution frame customers to have quick and easy access to the optical fibers and the drawers or shelves from the front of the distribution frame. A typical approach to providing this feature is to have the connector panel rotatably mounted on a vertical hinge as described in U.S. Pat. No. 4,708,430 to Donaldson et al. The patent discloses a cabinet with a removable front cover and a stack of splice trays positioned therein and an array of optical connectors mounted on a front panel. In order to gain access to the inside of the cabinet the front panel is hinged to the cabinet at one side so as to pivot open to expose the interior of the cabinet. A major shortcoming of the distribution cabinet is that it is necessary to detach the stack of splice trays and move the stack of splice trays forwardly in order for the trays to be readily accessible for repair or testing.

An alternative distribution frame is disclosed in Cooper U.S. Pat. No. 4,898,448 wherein a fiber distribution panel is disclosed that provides a slidable drawer that includes a slidably moveable integrated connector panel, splice shelf and cable storage unit. It has also been suggested that each tray including the panel containing the array of optical fiber connectors be pivotally mounted to a cabinet such as seen in Gotto et al. U.S. Pat. No. 4,832,436.

U.S. Pat. No. 5,129,030 to Petrunia discloses an optical fiber distribution frame including a plurality of shelves wherein each shelf has a tray positioned therein that includes an array of optical fiber connectors, and wherein each tray is slidably mounted within its corresponding shelf so that the tray can be pulled out horizontally from the shelf. Further, each slidable tray can be pivoted downward to provide front access to the optical fibers and optical fiber connectors in the distribution frame in which the plurality of tray containing shelves are mounted.

DISCLOSURE OF THE INVENTION

The present invention overcomes the prior art shortcomings by providing a cable distribution shelf for connecting incoming optical fiber cables with fiber optic patch cords or similar fiber optic cables. The shelf includes a housing comprising a middle plate extending transversely therethrough so as to define a front bay and a rear bay within the housing. The middle plate defines two or more laterally spaced-apart apertures therein. A first vertically-spaced stack of trays is pivotably mounted to the middle plate so that each tray is moveable from (1) an operative position with the front thereof positioned in a first middle plate aperture and substantially flush with the middle plate into (2) an extended forwardly pivoted position with the front of the tray facing inwardly within the housing. A second vertically-spaced stack of trays is provided and pivotably mounted to the middle plate so that each tray is moveable from (1) an installed position with the front thereof positioned in a second middle plate aperture and substantially flush with the middle plate into (2) an extended forwarded pivoted position with the front of the tray facing inwardly within the housing. A plurality of adapters are mounted to the front of each tray of the first and second vertically-spaced stacks of trays such that the adapters serve to connect incoming fiber optical connectors to outgoing fiber optical connectors.

Alternatively, other embodiments of the cable distribution shelf of the present invention contemplate that a vertical stack of one or more trays can be mounted to the middle plate so as to be positioned in either the first middle plate aperture or the second middle plate aperture and that no additional tray stack be mounted to the middle plate and positioned in the remaining middle plate aperture. Further, applicants contemplate that regardless of whether the cable distribution shelf of the present invention utilizes a singular stack of trays or two stacks of trays, the singular or dual stacks can each include between one and six trays and that each tray can include up to twelve or twenty-four adapters for connecting incoming optical fiber connectors (single or multiple) to outgoing optical fiber connectors. In this fashion, the cable distribution shelf of the present invention can accommodate up to twelve trays in the rear bay thereof that serve to connect up to a total of 144 optical fibers (using single fiber connectors) carried by the incoming optical fiber cables and selectively connected to the same compliment of 144 optical fibers of outgoing fiber optic patch cords or similar fiber optic cables.

It is therefore an object of the present invention to provide an improved optical fiber cable distribution shelf for use with an optical fiber distribution frame.

It is another object of the present invention to provide an improved optical fiber cable distribution shelf for use with an optical fiber distribution frame that provides for enhanced cable management in the front and rear of the shelf so as to render the shelf easier to install and simpler to integrate.

It is another object of the present invention to provide an improved optical fiber cable distribution shelf for use with a cable distribution frame wherein both the front and rear of the shelf are easily accessible.

It is another object of the present invention to provide an improved optical fiber cable distribution shelf for use with a cable distribution frame wherein if only front access is possible to the shelf, the rear side of the optical fiber adapters mounted to the shelf will still be accessible.

Some of the objects of the invention having been stated, other objects will become evident as the description proceeds when taken in connection with the accompanying drawings described herein below.

BRIEF DESCRIPTION OF THE DRAWINGS

FIG. 1 is a perspective view of the front of a cable distribution shelf in accordance with the present invention;

FIG. 2 is a perspective view of the rear of the cable distribution shelf shown in FIG. 1 with one stack of trays removed for clarity of description;

FIGS. 3A–3C are top plan, front elevation and side elevation views, respectively, of a left side tray of the cable distribution shelf shown in FIG. 1;

FIG. 5 is a front elevation view of the middle plate of the cable distribution shelf shown in FIG. 1;

FIG. 6 is a top plan view of the bottom plate of the cable distribution shelf shown in FIG. 1;

FIGS. 7A–7B are side elevation views of the right side plate and left side plate, respectively, of the cable distribution shelf shown in FIG. 1.

BEST MODE FOR CARRYING OUT THE INVENTION

Figure 4C:
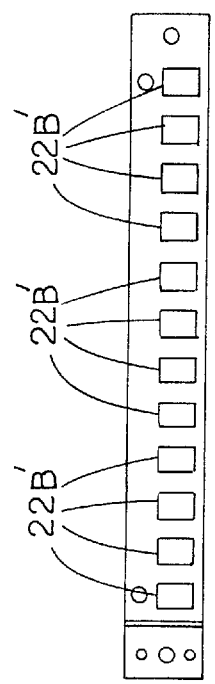
FIGS. 4A–4C are top plan, front elevation and side elevation, respectively, of a right side tray for the cable distribution shelf shown in FIG. 1.
Figure 4A:
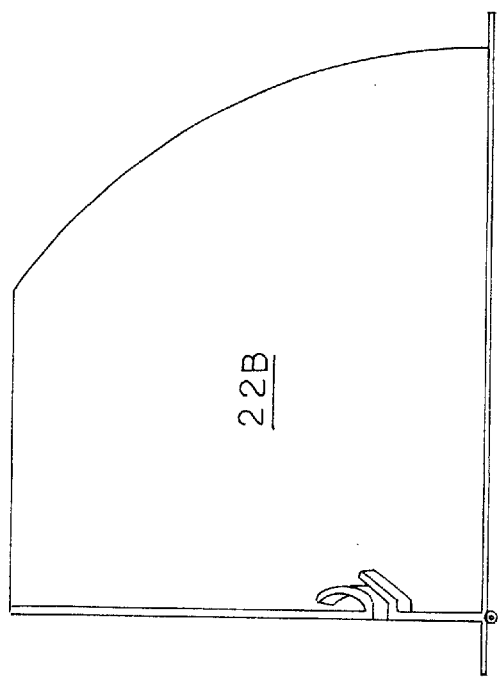
Figure 4B:
Figure 7A:
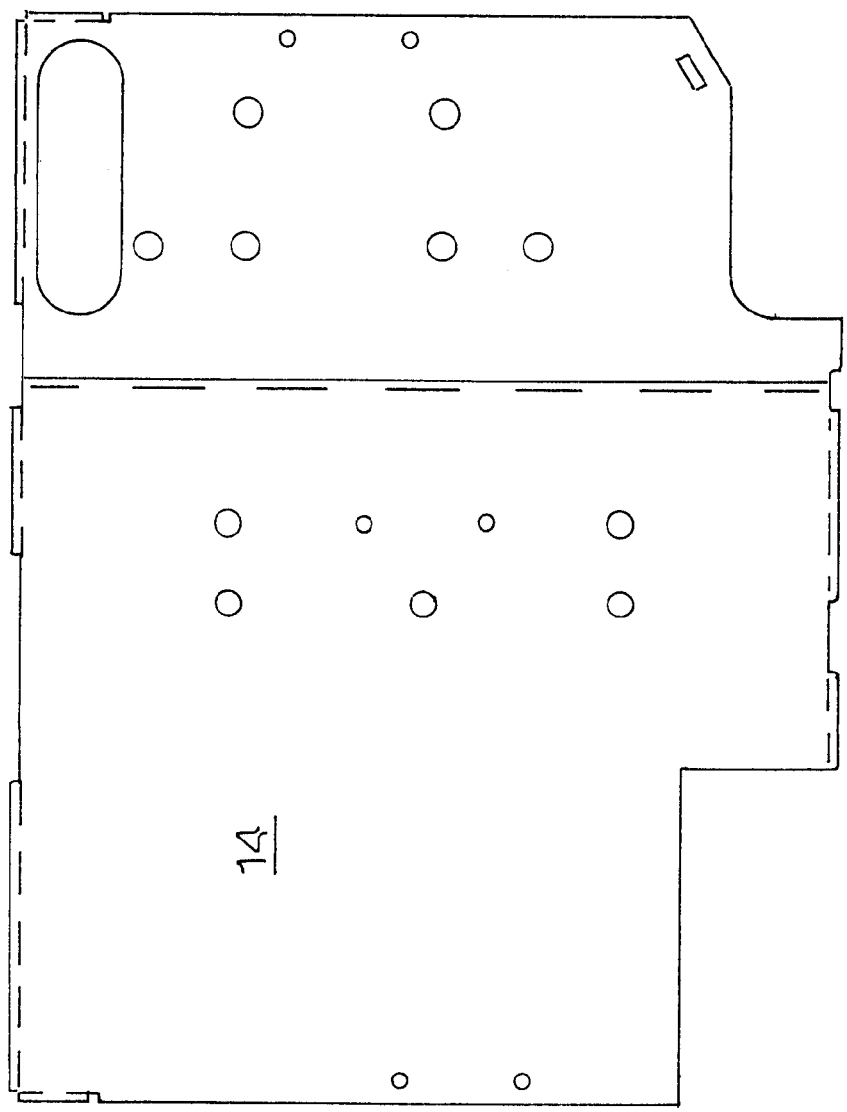
Figure 8:
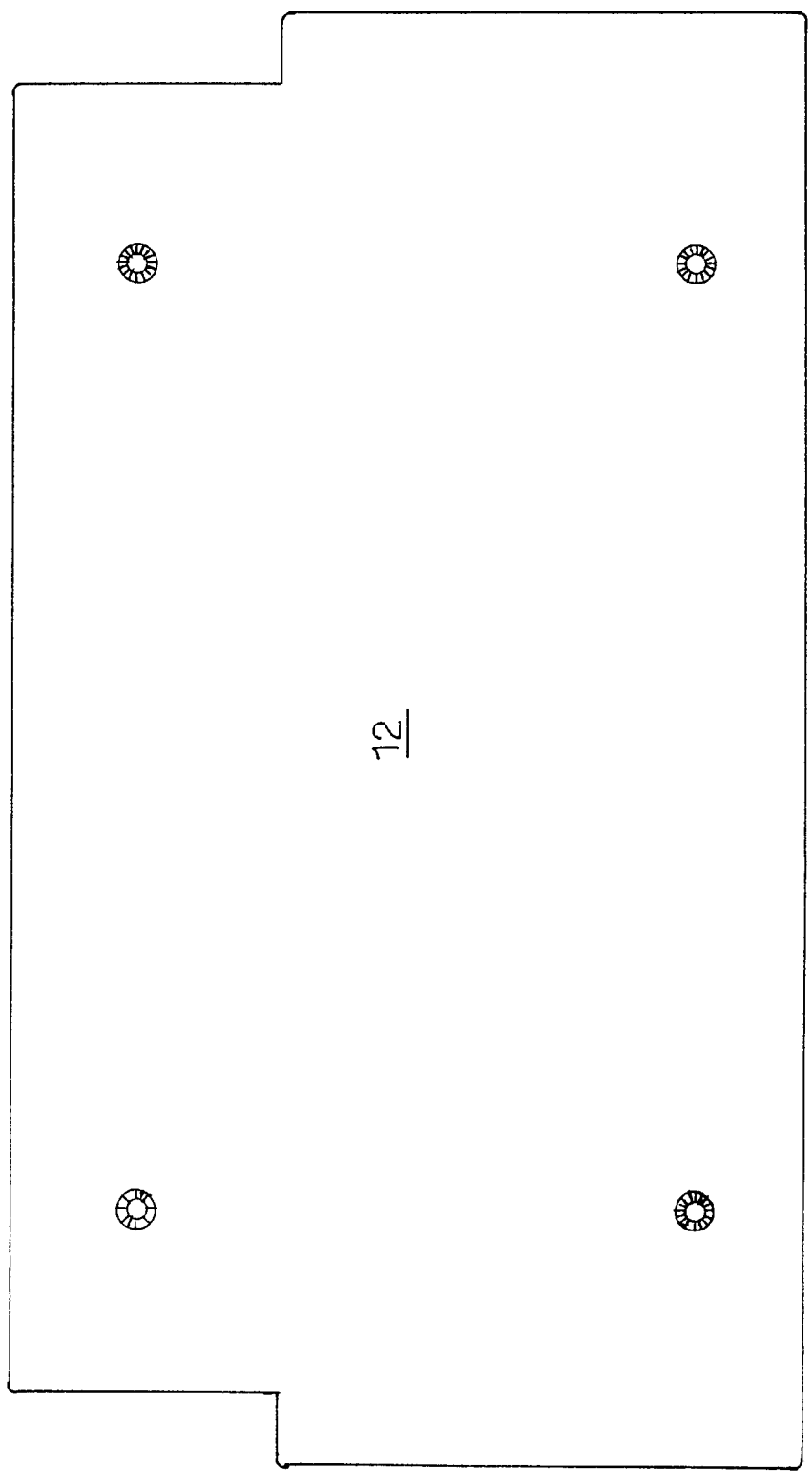
FIG. 8 is a top plan view of the top plate of the cable distribution shelf shown in FIG. 1.

Referring now to FIGS. 1–8 of the drawings, the drawings show a preferred embodiment of the optical fiber cable distribution shelf of the present invention that is generally designated 10. Optical fiber cable distribution shelf 10 serves for connecting incoming optical fiber cables with outgoing fiber optic cables. Shelf 10 includes top plate 12, right side plate 14, left side plate 16, bottom plate 18, and transversely extending middle plate 20. Middle plate 20 defines a first four-sided aperture 20A in the side adjacent left side wall 16 and a second four-sided aperture 20B laterally spaced-apart and adjacent right side plate 14.

As best seen in FIGS. 1 and 2, a first plurality of vertically spaced-apart trays 22A are pivotably mounted to the middle plate 20 and adjacent the inside vertical edge of aperture 20A. Each tray 22A is mounted adjacent the inside vertical edge of aperture 20A with a conventional pin hinge or pin-type latch (not shown) so that each vertically spaced-apart tray 22A can be pivoted from an installed position (see FIG. 2) with the front edge thereof flush with middle plate 20 into a forwardly pivoted extended position (see FIG. 1) with the front edge of tray 22A positioned in the front bay of shelf 10 and defining a substantially perpendicular angle with middle plate 20. Although six pivotably mounted trays are shown in FIG. 2 as being mounted in aperture 20A of middle plate 20, cable distribution shelf 10 is designed for mounting any number of trays 22A in the first vertically spaced-apart stack between one and six trays.

Also, cable distribution shelf 10 provides for mounting of a second vertically-spaced stack of trays 22B in aperture 20B of middle plate 20 in the same manner as trays 22A in the first vertical stack are pivotably mounted. In particular, each tray 22B is pivotably mounted by means of a suitable pin hinge (not shown) to middle plate 20 and adjacent the inside vertical edge of aperture 20B so that each tray 22B is pivotably moveable from an installed position with the front being positioned in aperture 20B substantially flush with middle plate 20 and into a forwardly-pivoted extended position (not shown) with the front face thereof facing inwardly so as to define a substantially perpendicular angle with the front surface of middle plate 20.

Optical fiber cable distribution shelf 10 is designed so that only the first vertical stack of between one and six trays 22A can be positioned in shelf 10 and remaining aperture 20B will be empty or covered with blank plates. Most suitably, a second vertical stack of trays 22B consisting of as little as one and as many as six pivotably mounted trays 22B are mounted to middle plate 20. Thus, cable distribution shelf 10 can consist of as many as twelve pivotably mounted trays consisting of six trays 22A and six trays 22B as shown in the drawings. However, cable distribution shelf 10 can utilize as few as one tray 22A or 22B positioned in either one of apertures 20A or 20B, respectively, as a matter of choice by the user.

Referring particularly to FIGS. 1 and 2 of the drawings, it will be observed that the leading upturned edge of each of trays 22A' and 22B' includes a plurality of laterally spaced-apart apertures therein 22A and 22B, respectively, in which are mounted optical fiber adapters 24. Although the number of adapters 24 utilized with each of trays 22A and 22B can be varied as a matter of choice, applicants contemplate that the preferred embodiment of optical fiber cable distribution shelf 10 will incorporate twelve or twenty-four adapters 24 mounted in front apertures 22A' and 22B' in each of trays 22A and 22B. An incoming optical fiber, ribbon, cord, etc. I from an optical fiber cable will be conducted along a pathway leading up the front medial portion of middle plate 20 and to incoming optical fiber connectors IC (see FIG. 1). Outgoing optical fibers are connected to outgoing optical fiber connectors OC (see FIG. 2) and the fan of fibers leads to a fiber, ribbon, tube, cord, etc. O in each of trays 22A and 22B that extends through a slot in each tray 22A and 22B near the pin hinge (not shown) and down the back medial portion of middle plate 20 so as to connect to an outgoing fiber, cord, cable, etc. either directly or by slice and then extend out the rear of shelf 10. As shown in FIGS. 1 and 2 of the drawings, an outgoing optical fiber connector OC is connected to the back side of a corresponding adapter 24 for each outgoing optical fiber and ultimately forms an outgoing fiber, ribbon, tube, cord, stub or cable stub O departing from cable distribution shelf 10.

Although many different configurations are contemplated by the invention, applicants note that one or more fibers, ribbons, tubes, cords, stubs or cable stubs O will typically lead from distribution shelf 10 and that one or more optical fibers, ribbons, tubes, cords, or cables I will typically be incoming to distribution shelf 10. In this fashion, distribution shelf 10 provides easy access by a technician to incoming optical fiber connectors IC and outgoing optical fiber connectors OC carried by each shelf 22A and 22B by moving one or more pivotable shelves 22A and 22B as needed during servicing of cable distribution shelf 10.

Cable distribution shelf 10 can be used in many ways including utilizing incoming optical fiber ribbon from a cable that is then fusion spliced to an optical fiber ribbon stub that is preconnectorized at the other end to a tray 22A or 22B. An optional platform with a cover to hold splice sleeves is available that attaches to the rear of the shelf. Another option for use of cable distribution shelf 10 includes using preconnectorized cable wherein a fusion splice is not used and the cable leads to outgoing optical fiber ribbon from a tray 22A or 22B. Typically, however, cable distribution shelf 10 contemplates an incoming optical fiber cable leading to the shelf and outgoing patch cords leading therefrom to individual telephone or computer systems in a manner well known in the fiber optic art.

Applicants note that conventional cable distribution shelves known in the art normally have a 72 optical fiber capacity although several manufacturers have developed 144 optical fiber capacity cable distribution shelves. However, none of the higher capacity cable distribution shelves satisfactorily address the issue of cable management in the front or rear or the issue of modularity. Typically, the conventional 144 optical fiber capacity shelves are merely an extension of 72 optical fiber shelves with all of the 144 optical fibers routed together in a bulky and difficult to manage routing configuration.

By contrast, cable distribution shelf 10 of the present invention provides a new and improved shelf for optical fiber routing management that renders shelf 10 easy to install and simple to integrate into existing systems. Distribution shelf 10 is constructed with a height less that 9.0 inches and utilizes a modular design wherein each optical fiber, ribbon, cord or tube is individually routed in the rear and the front optical fiber cords are separated therefrom to allow for easy identification and access to broken fibers or optical fiber connectors by a technician.

Summarily, applicants cable distribution shelf 10 provides for ease of accessibility to both the front of the cable shelf and rear of the trays due to the individual pivotably mounted tray configuration provided therein. By allowing each tray in the vertically spaced-apart stack(s) of trays to pivot about its axis, a technician can easily open a selected tray to access the front and rear of the tray without any obstruction from either above or below. Moreover, cable distribution shelf 10 provides horizontal routing troughs in the bottom of the front and rear bays thereof in order to route the optical fibers generally horizontally towards the center and maintain the optical fibers in a location so as not to interfere with the pivotal movement of trays 22A and/or 22B.

It will be understood that various details of the invention may be changed without departing from the scope of the invention. Furthermore, the foregoing description is for the purpose of illustration only, and not for the purpose of limitation--the invention being defined by the claims.

What is claimed is:

1. A cable distribution shelf for connecting incoming optical fiber cables with fiber optic patch cords or similar fiber optic cables, said cable distribution shelf comprising:
    (a) a housing having a divider wall extending transversely therethrough so as to define a front bay and a rear bay therein;
    (b) said divider wall defining at least two laterally spaced-apart apertures therein;
    (c) a first vertically-spaced stack of trays being pivotably mounted to said divider wall so that each tray is moveable from (1) an operative position with the front thereof being positioned in a first divider wall aperture and substantially flush with said divider wall into (2) an extended forwardly pivoted position with the front thereof facing inwardly;
    (d) a second vertically-spaced stack of trays being pivotably mounted to said divider wall so that each tray is moveable from (1) and operative position with the front thereof being positioned in a second divider wall aperture and substantially flush with said divider wall into (2) an extended forwardly pivoted position with the front thereof facing inwardly; and
    (e) a plurality of adapters being mounted to the front of each tray of said first and second vertically-spaced stacks of trays, said adapters serving to connect incoming optical fiber connectors to outgoing optical fiber connectors.

2. The cable distribution shelf according to claim 1, wherein housing is constructed so that either the front bay or the rear bay can be easily accessed from the front or rear, respectively, of said housing.

3. The cable distribution shelf according to claim 1, wherein said divider wall defines two laterally spaced-apart apertures therein and wherein each of said two laterally spaced-apart apertures has a width and a height that substantially corresponds to the width and height of a corresponding one of said two stacks of trays.

4. The cable distribution shelf according to claim 1, wherein each of said trays of said first and second stacks of trays defines a front upwardly extending lip that has a plurality of optical fiber adapters mounted in laterally spaced-apart relationship therein.

5. The cable distribution shelf according to claim 4, wherein said plurality of optical fiber adapters comprises twelve or twenty-four optical fiber adapters.

6. The cable distribution shelf according to claim 1, wherein each tray of said first stack of trays is pivotably mounted to said divider wall adjacent to the vertical inside edge of the first aperture and each tray of said second stack of trays is pivotably mounted to said divider wall adjacent to the vertical inside edge of the second aperture.

7. The cable distribution shelf according to claim 6, wherein each of said trays is pivotably mounted to said divider wall with a pin-type hinge.

8. The cable distribution shelf according to claim 6, wherein each of said trays of said first and second stacks of trays is adapted to pivot about 90 degrees outwardly from said operative position into said extended forwardly pivoted position where the lip thereof defines a substantially perpendicular angle with said divider wall.

9. The cable distribution shelf according to claim 1, wherein each of said first and second stacks of trays comprises one to six trays and wherein each tray comprises either twelve or twenty-four adapters for connecting incoming optical fiber connectors to outgoing optical fiber connectors.

10. The cable distribution shelf according to claim 1, including a trough in the bottom of the front bay and the back bay for routing optical fibers towards the center of said divider wall.

11. A cable distribution shelf for connecting incoming optical fiber cables with fiber optic patch cords or similar fiber optic cables, said cable distribution shelf comprising:
    (a) a housing having a divider wall extending transversely therethrough so as to define a front bay and a rear bay therein;
    (b) said divider wall defining two laterally spaced-apart apertures therein;
    (c) a first vertically-spaced stack of trays being pivotably mounted to said divider wall so that each tray is moveable from (1) an operative position with the front thereof being positioned in the first divider wall aperture and substantially flush with said divider wall into (2) an extended forwardly pivoted position with the front thereof facing inwardly;
    (d) a second vertically-spaced stack of trays being pivotably mounted to said divider wall so that each tray is moveable from (1) an operative position with the front thereof being positioned in the second divider wall aperture and substantially flush with said divider wall into (2) an extended forwardly pivoted position with the front thereof facing inwardly;
    (e) each tray of said first stack of trays is pivotably mounted to said divider wall adjacent the vertical inside edge of the first aperture and each tray of said second stack of trays is pivotably mounted to said divider wall adjacent to the vertical inside edge of the second aperture; and
    (f) a plurality of adapters being mounted to the front of each tray of said first and second vertically-spaced stacks of trays, said adapters serving to connect incoming optical fiber connectors to outgoing optical fiber connectors.

12. The cable distribution shelf according to claim 11, wherein housing is constructed so that either the front bay or the rear bay can be easily accessed from the front or rear, respectively, of said housing.

13. The cable distribution shelf according to claim 11, wherein each of said two laterally spaced-apart apertures has a width and a height that substantially corresponds to the width and height of a corresponding one of said two stacks of trays.

14. The cable distribution shelf according to claim 11, wherein each of said trays of said first and second stacks of trays defines a front upwardly extending lip that has a plurality of optical fiber adapters mounted in laterally spaced-apart relationship therein.

15. The cable distribution shelf according to claim 14, wherein said plurality of optical fiber adapters comprises twelve or twenty-four optical fiber adapters.

16. The cable distribution shelf according to claim 11, wherein each of said trays is pivotably mounted to said divider wall with a pin-type hinge.

17. The cable distribution shelf according to claim 11, wherein each of said trays of said first and second stacks of trays is adapted to pivot about 90 degrees outwardly from said operative position into said extended forwardly pivoted position where the lip thereof defines a substantially perpendicular angle with said divider wall.

18. The cable distribution shelf according to claim 11, wherein each of said first and second stacks of trays comprises one to six trays and wherein each tray comprises either twelve or twenty-four adapters for connecting incoming optical fiber connectors to outgoing optical fiber connectors.

19. The cable distribution shelf according to claim 11, including a trough in the bottom of the front bay and the back bay for routing optical fibers towards the center of said divider wall.

20. The cable distribution shelf according to claim 11, wherein said shelf defines space above said first and second stacks of trays to provide access to the top tray within each of said first and second stacks of trays.

21. A cable distribution shelf for connecting incoming optical fiber cables with fiber optic patch cords or similar fiber optic cables, said cable distribution shelf comprising:

(a) a housing having a divider wall extending transversely therethrough so as to define a front bay and a rear bay therein;

(b) said divider wall defining at least two laterally spaced-apart apertures therein;

(c) at least one vertically-spaced stack of trays being pivotably mounted to said divider wall so that each tray is moveable from (1) an operative position with the front thereof being positioned in a corresponding one of said at least two divider wall apertures and substantially flush with said divider wall into (2) an extended forwardly pivoted position with the front thereof facing inwardly; and (d) a plurality of adapters being mounted to the front of each tray of said at least one vertically-spaced stack of trays, said adapters serving to connect incoming optical fiber connectors to outgoing optical fiber connectors.

22. The cable distribution shelf according to claim 21, including a second vertically-spaced stack of trays being pivotably mounted to said divider wall so that each tray is moveable from (1) an operative position with the front thereof being positioned in a second middle plate aperture and substantially flush with said divider wall into (2) an extended forwardly pivoted position with the front thereof facing inwardly.

23. The cable distribution shelf according to claim 22, wherein each of said first and second stacks of trays comprises one to six trays and wherein each tray comprises twelve or twenty-four adapters for connecting incoming optical fiber connectors to outgoing optical fiber connectors.

24. The cable distribution shelf according to claim 23, wherein each of said first and second stacks of trays comprises one to six trays and wherein each tray comprises twelve or twenty-four adapters for connecting incoming optical fiber connectors to outgoing optical fiber connectors.

* * * * *